US008750245B2

(12) United States Patent
Bakthavathsalu et al.

(10) Patent No.: US 8,750,245 B2
(45) Date of Patent: Jun. 10, 2014

(54) METHODS AND APPARATUS FOR USE IN INITIATING VERTICAL HANDOVER BASED ON COMPARATIVE EVALUATION OF WLAN AND WWAN SIGNAL QUALITIES

(75) Inventors: Krishna Kumar Bakthavathsalu, Mississauga (CA); Ion Barbu, Waterloo (CA); Nayef Fawaz Mendahawi, Waterloo (CA); Ahmad Mohammad Kholaif, Waterloo (CA)

(73) Assignee: BlackBerry Limited, Waterloo (CA)

( * ) Notice: Subject to any disclaimer, the term of this patent is extended or adjusted under 35 U.S.C. 154(b) by 420 days.

(21) Appl. No.: 13/036,989

(22) Filed: Feb. 28, 2011

(65) Prior Publication Data
US 2012/0163344 A1 Jun. 28, 2012

Related U.S. Application Data

(63) Continuation-in-part of application No. 12/713,235, filed on Feb. 26, 2010, now Pat. No. 8,195,251.

(51) Int. Cl.
*H04W 4/00* (2009.01)
*H04W 36/00* (2009.01)

(52) U.S. Cl.
CPC .................................... *H04W 36/00* (2013.01)
USPC ........... 370/331; 370/328; 370/338; 370/342; 370/401; 455/436; 455/437; 455/438; 455/439; 455/456; 455/552

(58) Field of Classification Search
None
See application file for complete search history.

(56) References Cited

U.S. PATENT DOCUMENTS

| 6,781,971 | B1 | 8/2004 | Davis et al. |
| 6,985,432 | B1 | 1/2006 | Hadad |
| 7,006,840 | B2 | 2/2006 | Bultan et al. |
| 7,443,826 | B1 | 10/2008 | Atarius et al. |
| 7,574,212 | B2 * | 8/2009 | McConnell et al. .......... 455/437 |
| 7,684,373 | B2 | 3/2010 | Ekvetchavit et al. |
| 2004/0114553 | A1 | 6/2004 | Jiang et al. |
| 2004/0266426 | A1 | 12/2004 | Marsh et al. |
| 2005/0053034 | A1 | 3/2005 | Chiueh |
| 2005/0070288 | A1 | 3/2005 | Belkin et al. |
| 2005/0101278 | A1 | 5/2005 | Peng |
| 2005/0239497 | A1 | 10/2005 | Bahl et al. |
| 2005/0286466 | A1 | 12/2005 | Tagg et al. |
| 2006/0056448 | A1 | 3/2006 | Zaki et al. |
| 2006/0111112 | A1 | 5/2006 | Maveddat |
| 2007/0070948 | A1 | 3/2007 | Kezys et al. |

(Continued)

*Primary Examiner* — Jae Y Lee
*Assistant Examiner* — Aixa A Guadalupe-Cruz
(74) *Attorney, Agent, or Firm* — Ridout & Maybee LLP

(57) ABSTRACT

Techniques in a mobile device for use in initiating vertical handover of a voice or a data call between a wireless local area network (WLAN) and a wide area wireless network (WWAN) are described. The mobile device performs communication operations for maintaining the voice or the data call via the WLAN or the WWAN. During the voice or the data call, the mobile device identifies a WLAN signal quality value of signals with the WLAN, as well as a WWAN signal quality value of signals with the WWAN. The mobile device then performs a comparative evaluation of the WLAN and the WWAN signal quality values, and initiates a vertical handover of the voice or the data call between the WLAN and the WWAN based on the comparative evaluation of the WLAN and WWAN signal quality values. The comparative evaluation may involve calculating a signal indicator value which is based on a ratio of the WLAN and the WWAN signal quality values. Alternatively, the comparative evaluation may involve comparing or finding the difference between the WLAN and the WWAN signal quality values.

18 Claims, 12 Drawing Sheets

(56) References Cited

U.S. PATENT DOCUMENTS

| | | |
|---|---|---|
| 2007/0076664 A1 | 4/2007 | An et al. |
| 2008/0101318 A1* | 5/2008 | Taaghol et al. ............... 370/342 |
| 2008/0132228 A1 | 6/2008 | Mousseau et al. |
| 2009/0010226 A1 | 1/2009 | Nishimura et al. |
| 2009/0143026 A1 | 6/2009 | Jaffri et al. |
| 2010/0304738 A1 | 12/2010 | Lim |
| 2012/0106514 A1 | 5/2012 | Zheng et al. |

* cited by examiner

METHODS AND APPARATUS FOR USE IN INITIATING VERTICAL HANDOVER BASED ON COMPARATIVE EVALUATION OF WLAN AND WWAN SIGNAL QUALITIES

CROSS-REFERENCE TO RELATED APPLICATION

The present application is a continuation-in-part of and claims priority to U.S. non-provisional patent application having application Ser. No. 12/713,235 and filing date of 26 Feb. 2010, which is hereby incorporated by reference herein.

FIELD OF THE DISCLOSURE

The present disclosure relates to the field of wireless communications for a mobile communication device, and more particularly relates to methods and apparatus for use in initiating vertical handover of a voice or a data call between a wireless local area network (WLAN) and a wireless wide area network (WWAN) based on a comparative evaluation of WLAN and WWAN signal qualities.

BACKGROUND

Mobile communication devices may be configured to provide voice communications as well as data communications with use of software applications. Examples of software applications used in these wireless devices include microbrowsers, address books, email clients, instant messaging (IM) clients, and wavetable instruments.

Such mobile devices may also have access to a plurality of services via the Internet. A mobile device may, for example, be used to browse web sites on the Internet, to transmit and receive graphics, and to execute streaming audio and/or video applications. The transfer of Internet content to and from wireless device is typically facilitated by the Wireless Application Protocol (WAP), which integrates the Internet and other networks with wireless network platforms. Such mobile devices may operate on a cellular network, on a wireless local area network (WLAN), or on both of these types of networks.

With respect to WLANs, the term "Wi-Fi" or Wireless Fidelity pertains to certain types of WLANs that use specifications in the Institute of Electrical and Electronics Engineers ("IEEE") 802.11 family. In a WLAN, an access point (AP) is a station that transmits and receives data (sometimes referred to as a transceiver). The AP in an infrastructure BSS ("Basic Service Set"), or a client node acting as an AP in an Independent BSS, connects devices to other devices within the network. Such AP may also serve as the point of interconnection between the WLAN and a wired LAN. Each AP can serve multiple users within a defined WLAN area. As users move beyond the range of one AP (i.e. when they roam), they are automatically handed over to the next AP. Note that a small WLAN may only utilize a single AP or only a few APs. The number of APs required increases as a function of the number of network devices/users and the physical size of the network. The AP may be an IEEE 802.11 (i.e. WLAN) radio receiver/transmitter (or transceiver), and function as a gateway or bridge between a WLAN and a wired LAN.

A block diagram illustrating an example wireless communications system is shown in FIG. 1. The example system, generally referenced 10, comprises one or more mobile devices 12 implementing a WLAN station (or STA) connected to access point (AP) 14 which is connected to WLAN 16. The system also comprises a cellular base station 20 in communication over an air interface to mobile device 12. Base station 20 is connected to a WWAN 22 (e.g. a cellular telecommunications network) which is also connected to WLAN 16.

In implementing the WLAN protocol, mobile devices often utilize so called WLAN profiles to aid in establishing connections with the APs and WLANs. A WLAN profile defines the parameters for the connection between the mobile device and WLAN networks including APs. Profiles typically include connection-related information including, for example, Set Service Identifier (SSID), connection type (i.e. open or shared key), security, authentication, encryption, WEP shared keys, key length, frequency bands, roaming enable/disable, SSID broadcasted, etc.

A SSID identifies a particular WLAN. Mobile device 12 receives broadcast messages from all access points within range advertising their SSIDs. Mobile device 12 can then either manually or automatically select the network with which to associate. It is legitimate for multiple APs to share the same SSID if they provide access to the same network as part of an extended service set. On the other hand, the BSS is the basic building block of an IEEE 802.11 wireless LAN. In infrastructure mode, one AP together with all associated mobile devices is called a BSS. An AP acts as a master to control the mobile devices within that BSS. Each BSS is identified by a BSS Identifier (BSSID). The most basic BSS is two mobile devices in Independent mode. In infrastructure mode, a basic BSS consists of one AP and one mobile device. The BSSID uniquely identifies each BSS (the SSID however, can be used in multiple, possibly overlapping, BSSs). In an infrastructure BSS, the BSSID is the MAC address of the wireless access point (WAP).

When a mobile device wants to access an existing BSS (for example, as after power-up, sleep mode or just entering a BSS area), the mobile device must get synchronization information from the AP. The mobile device obtains this information by either (1) passive scanning whereby the mobile device waits to receive a beacon frame (and/or probe responses sent in response to other devices' probe requests) from the AP; or (2) active scanning whereby the mobile device attempts to find an AP by transmitting probe request frames and waiting for a probe response from the AP. Note that the beacon frame is a periodic frame sent by the AP containing synchronization information. Once the mobile device has found an AP, in order to join the BSS, it must perform an authentication process which involves the exchange of information between the AP and the mobile device, where each side shows knowledge of a shared credential(s). Once authenticated, the mobile device begins the association process which involves the exchange of information about the mobile device and BSS capabilities. Only after the association process is complete, is the mobile device permitted to transmit and receive data frames with the AP.

As mentioned above, the mobile device may be configured to operate for communications in WLANs as well as a cellular telecommunication network, more generally referred to herein as one type of wireless wide area networks (WWAN). With these types of mobile devices, it is advantageous to be able to quickly and reliably detect when the mobile device should be handed over from the WLAN to the WWAN, and vice versa, so that communication sessions (e.g. voice calls or data calls) of the mobile device may be seamlessly maintained. Handing over from one type of wireless network to another type of wireless network (i.e. handing over between such heterogeneous networks) may be referred to as a vertical handover (VHO). If the mobile device is able to quickly and reliably detect its movement or transitioning (e.g. that the mobile device is about to leave the WLAN), for example, a connection may be established between the mobile device and the WWAN before the connection with the WLAN is lost.

BRIEF DESCRIPTION OF THE DRAWINGS

The network switching trigger mechanism is herein described, by way of example only, with reference to the accompanying drawings, wherein.

DETAILED DESCRIPTION OF THE EMBODIMENTS

Figure 1:
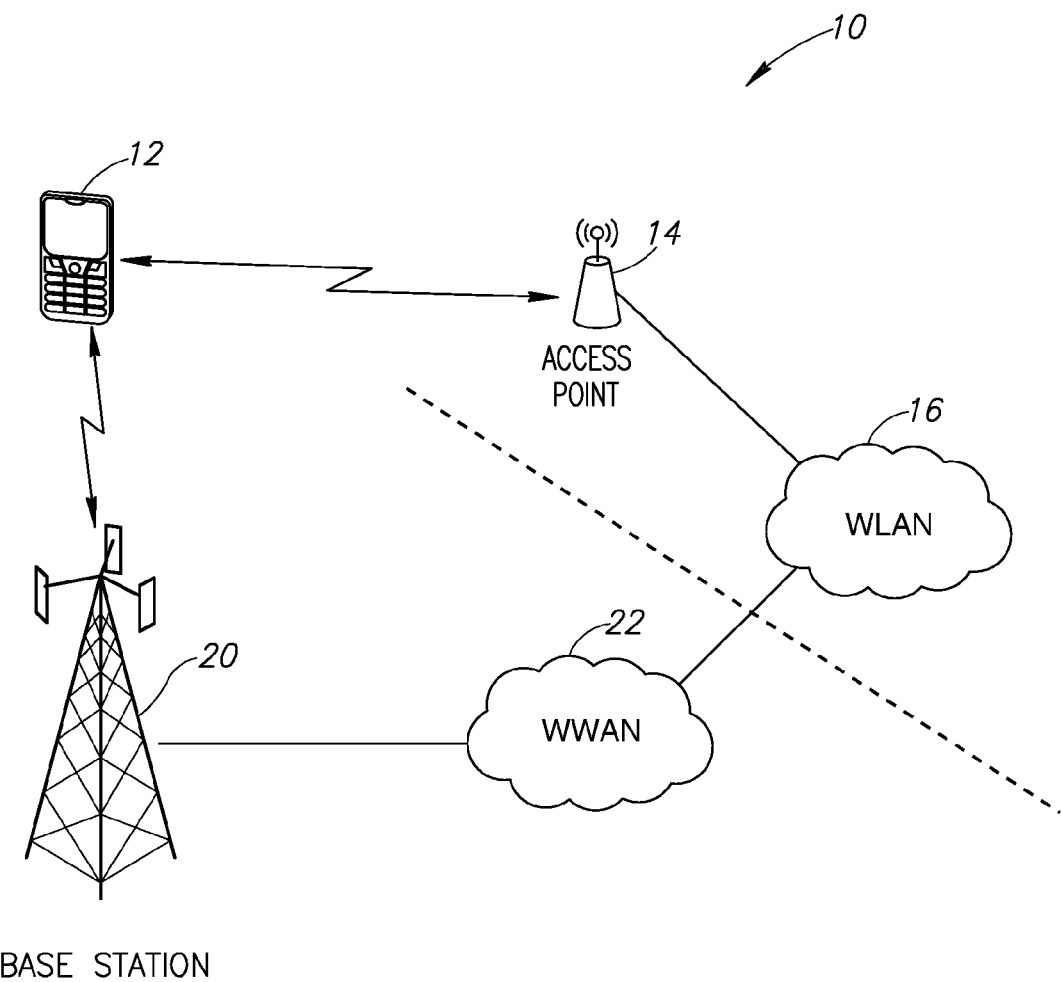
FIG. 1 is a block diagram illustrating an example wireless communications system.

Techniques in a mobile device for use in initiating vertical handover of a voice or a data call between a wireless local area network (WLAN) and a wide area wireless network (WWAN) are described. The mobile device performs communication operations for maintaining the voice or the data call via the WLAN or the WWAN. During the voice or the data call, the mobile device identifies a WLAN signal quality value of signals with the WLAN as well as a WWAN signal quality value of signals with the WWAN. The mobile device then performs a comparative evaluation of the WLAN and the WWAN signal quality values, and initiates a vertical handover of the voice or the data call between the WLAN and the WWAN based on the comparative evaluation of the WLAN and WWAN signal quality values. The comparative evaluation may involve calculating a signal indicator value which is based on a ratio of the WLAN and the WWAN signal quality values. Alternatively, the comparative evaluation may involve comparing or finding the difference between the WLAN and the WWAN signal quality values.

The following notation is used throughout this document:

| Term | Definition |
|---|---|
| AP | Access Point |
| ARP | Address Resolution Protocol |
| ASIC | Application Specific Integrated Circuit |
| BSS | Basic Service Set |
| BSSID | Basic Service Set ID |
| CDROM | Compact Disc Read Only Memory |
| CPU | Central Processing Unit |
| DHCP | Dynamic Host Configuration Protocol |
| DNS | Domain Name Server |
| DSP | Digital Signal Processor |
| EDGE | Enhanced Data rates for GSM Evolution |
| EEROM | Electrically Erasable Read Only Memory |
| EPROM | Erasable Programmable Read-Only Memory |
| FM | Frequency Modulation |
| FPGA | Field Programmable Gate Array |
| FTP | File Transfer Protocol |
| GPRS | General Packet Radio Service |
| GPS | Global Positioning System |
| GSM | Global System for Mobile communications |
| HDL | Hardware Description Language |
| HTTP | Hyper-Text Transport Protocol |
| IEEE | Institution of Electrical and Electronics Engineers |
| IM | Instant Messaging |
| IP | Internet Protocol |
| LAN | Local Area Network |
| MAC | Media Access Control |
| PC | Personal Computer |
| PCI | Peripheral Component Interconnect |
| PDA | Personal Digital Assistant |
| PNA | Personal Navigation Assistant |
| RAM | Random Access Memory |
| RAT | Radio Access Technology |
| RF | Radio Frequency |
| ROM | Read Only Memory |
| RSSI | Received Signal Strength Indicator |
| RUIM | Re-Usable Identification Module |
| SDIO | Secure Digital Input/Output |
| SIM | Subscriber Identity Module |
| SPI | Serial peripheral interconnect |
| SSID | Service Set Identifier |
| TCP | Transport Control Protocol |
| UI | User Interface |
| URL | Uniform Resource Locator |
| USB | Universal Serial Bus |
| UWB | Ultra-Wideband |
| WAN | Wide Area Network |
| WAP | Wireless Access Point |
| WAP | Wireless Application Protocol |
| WEP | Wired Equivalent Protocol |
| WLAN | Wireless Local Area Network |

According to techniques of the present disclosure, a network switching trigger mechanism is operative to initiate a vertical handover based on a comparative evaluation of WLAN and cellular signal strengths (e.g. RSSI values). The network switching trigger mechanism is operative to monitor a signal indicator value for changes in the WLAN and cellular signal strengths. In one embodiment, the signal indicator value is calculated based on a cellular/WLAN signal quality ratio, which may be produced based on RSSI values received from both (i.e. WLAN and cellular) air interfaces. In another embodiment, the signal indicator value is obtained based on the difference (by comparing, or finding the difference) between the WLAN and the WWAN signal quality values.

The signal trend is monitored to detect location transitioning of the mobile device (i.e. indoor-to-outdoor, or outdoor-to-indoor). Depending on the signal changes detected, the mobile device triggers the switching of the voice or data call between WLAN and cellular networks. During such monitoring, an increase in cellular signal strength coupled with a decrease in WLAN signal strength (i.e. ratio increases) indicates that the mobile device may be moving to an outdoor environment (e.g. where WLAN coverage may be sparse or limited). Thus, such transitioning serves as a trigger for the mobile device to initiate a vertical handover of the voice or data call from WLAN to cellular. Conversely, a decrease in cellular signal strength coupled with an increase in WLAN signal strength indicates that the mobile device may be moving to an indoor environment. Here, such transitioning serves as a trigger for the mobile device to initiate a vertical handover of the voice or data call from cellular to WLAN.

As described, the WLAN signal quality value may be a WLAN RSSI value, and the cellular signal quality value may be a cellular RSSI value. The ratio may be a cellular/WLAN signal quality ratio. In the alternative, a WLAN/cellular signal quality ratio (i.e. the inverse) may be utilized. Although the signal indicator value may be derived or calculated based on such ratio, the derivation or calculation may also involve multiplying the ratio by a constant value or other variable value(s), and/or may involve summing such ratio value with a constant value or other variable value(s), if needed for producing a more reliable signal indicator.

Only to ease in the description thereof, the inventive mechanism may be described herein with a focus on use of the cellular/WLAN ratio as opposed to the WLAN/cellular ratio. Also to ease in the description, the term "ratio" in this document may be interchangeable with use of the broader notion of the signal indicator value.

To aid in illustrating the implementations of the network switching trigger mechanism, the various implementations described infra are described in the context of an example communication system including a mobile device that implements IEEE 802.11-based wireless networking standards. It is appreciated, however, that those of ordinary skill in the art, using the teachings provided herein, can implement the disclosed techniques using other wireless standards and networks without departing from the scope of the mechanism. Accordingly, references to techniques and components specific to IEEE 802.11 apply also to the equivalent techniques or components in other wireless network standards unless otherwise noted.

Note that some aspects of the mechanism described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits implemented in an Application Specific Integrated Circuit (ASIC) or Field Programmable Gate Array (FPGA), or as functionally equivalent discrete hardware components.

As will be appreciated by one skilled in the art, the network switching trigger mechanism may be implemented as a system, method, computer program product or any combination thereof. Accordingly, the network switching trigger mechanism may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the network switching trigger mechanism may take the form of a computer program product implemented in any tangible medium of expression having computer usable program code implemented in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code implemented therewith, either in baseband or as part of a carrier wave. The computer usable program code may be transmitted using any appropriate medium, including but not limited to wireless, wireline, optical fiber cable, RF, etc.

Computer program code for carrying out operations of the network switching trigger mechanism may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The network switching trigger mechanism is described below with reference to flowchart illustrations and/or block diagrams of methods, apparatus (systems) and computer program products according to implementations thereof. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is noted that computer programs implementing the network switching trigger mechanism can be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this mechanism. All these operations are well-known to those skilled in the art of computer systems.

The flowchart and block diagrams in the Figures illustrate the architecture, functionality, and operation of possible implementations of systems, methods and computer program products according to various implementations of the network switching trigger mechanism. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Mobile Device Implementation

Figure 2:
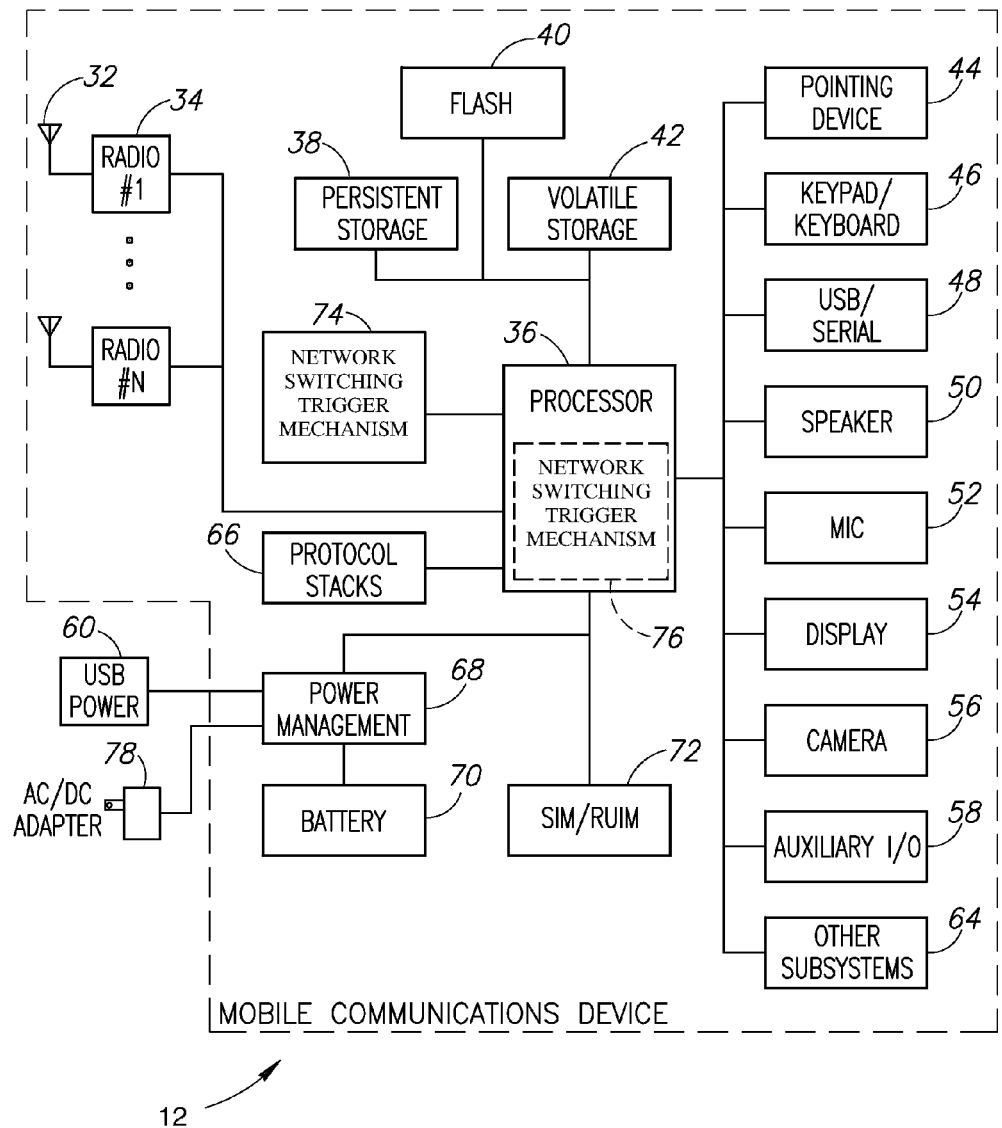
FIG. 2 is a block diagram illustrating an example mobile communication device incorporating the network switching trigger mechanism.

A block diagram illustrating an example mobile communication device 12 incorporating the network switching trigger mechanism is shown in FIG. 2. Mobile device 12 is preferably a two-way communication device having voice and data communication capabilities. In addition, mobile device 12 optionally has the capability to communicate with other computer systems via the Internet. Note that mobile device 12 may comprise any suitable wired or wireless device such as multimedia player, mobile device, cellular phone, smartphone, PDA, PNA, Bluetooth device, etc. For illustration purposes only, mobile device 12 is shown as a mobile device, such as a cellular-based smartphone. Note that this example is not intended to limit the scope of the mechanism as the network switching trigger mechanism can be implemented in a wide variety of communication devices. It is further appreciated mobile device 12 shown is intentionally simplified to illustrate only certain components, as the mobile device 12 may comprise other components and subsystems 64 beyond those shown.

Mobile device 12 of FIG. 2 comprises one or more processors 36 which may comprise a baseband processor, CPU, microprocessor, DSP, etc., optionally having both analog and digital portions. Mobile device 12 may comprise a plurality of radios 34 (or wireless transceivers) and associated antennas 32. In the present embodiment, the radios 34 or wireless transceivers include at least a WLAN transceiver and a WWAN (cellular) transceiver. Note that radios for any number of other wireless standards and Radio Access Technologies (RATs) may be included. Examples include, but are not limited to, Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc. Mobile device 12 also comprises protocol stacks 66, which may or may not be entirely or partially implemented in the processor 36. The protocol stacks implemented will depend on the particular wireless protocols required.

Mobile device 12 may also comprise internal volatile storage 42 (e.g. RAM) and persistence storage 38 (e.g. ROM) and flash memory 40. Persistent storage 38 also stores applications executable by processor 36 including the related data files used by those applications to allow mobile device 12 to perform its intended functions. Several user-interface devices include trackball/thumbwheel 44 which may comprise a depressible thumbwheel/trackball that is used for navigation, selection of menu choices and confirmation of action, keypad/keyboard 46 such as arranged in QWERTY fashion for entering alphanumeric data and a numeric keypad for entering dialing digits and for other controls and inputs (the keyboard may also contain symbol, function and command keys such as a phone send/end key, a menu key and an escape key), microphone(s) 52, speaker(s) 50 and associated audio codec or other multimedia codecs, vibrator (not shown) for alerting a user, camera and related circuitry 56, display(s) 54 and associated display controller. A serial/USB or other interface connection 48 (e.g. SPI, SDIO, PCI, USD, etc.) provides a serial link to a user's PC or other device. SIM/RUIM card 72 provides the interface to a user's SIM or RUIM card for storing user data such as address book entries, user identification, etc.

Portable power is provided by the battery 70 coupled to power management circuitry 68. External power is provided via USB power 60 or an AC/DC adapter 78 connected to the power management circuitry 68 which is operative to manage the charging and discharging of the battery 70.

Mobile device 12 is also configured to implement the network switching trigger mechanism 74. Alternatively (or in addition to), the network switching trigger mechanism may be implemented as a task 74 stored in external memory executed by the processor 36 or may be implemented as a task 76 executed from memory embedded in processor 36. The network switching trigger mechanism task blocks 74, 76 are configured to implement the network switching trigger mechanism as described in more detail infra. Note that the network switching trigger mechanism may be implemented as hardware, software or as a combination of hardware and software. Implemented as a software task, the program code operative to implement the network switching trigger mechanism is stored in one or more memories 38, 40, 42 or local memories within the processor 36.

Network Switching Trigger Mechanism

The IEEE 802.11 standard defines several services that govern how two IEEE 802.11 devices communicate. In current WLAN technology, WLAN profiles play a vital role in WLAN connectivity. A profile is identified by a unique identifier, Service Set Identifier (SSID). It also specifies the frequency band of operation, data rates, transmit power levels and security methods used for authentication and encryption and the corresponding credentials. A user can specify multiple profiles on his device that could be geographically collocated or they could map to WLAN networks installed in different areas (e.g. home vs. office, etc).

Today, many mobile devices are equipped not only with the primary cellular air interface but with WLAN radios as well, e.g. dual-band mobile smart phones that feature both cellular and WLAN air interfaces). Such multi-radio devices must perform a scan in order to discover the neighboring Access Points (APs) to which the handset can associate/connect. An AP must match one of the profiles stored on the mobile device (either created by the user or pushed by an IT policy) for the mobile device to associate with. Typical implementations of the WLAN algorithm include scanning at regular intervals for WLANs in saved WLAN profiles, with or without use of a backoff algorithm.

The network switching trigger mechanism is operative to use signals and/or information from both the WLAN and the cellular network to determine whether the mobile device (also referred to as handset, WLAN client, client, handheld or device) is transitioning from indoors to outdoors, or outdoors to indoors. Specifically, the network switching trigger mechanism is operative to initiate a vertical handover based on a comparative evaluation of WLAN and cellular signal strengths (e.g. RSSI values). It is noted that many existing WLAN installations are more common in indoor areas as an extension to cellular networks coverage. When outdoor, users typically have very good cellular coverage (except when crossing cell boundaries) and much weaker WLAN coverage (if any).

In one embodiment, a signal indicator value is regularly or periodically monitored by the mobile device. Such signal indicator value may be derived or calculated based on a ratio of WLAN and WWAN signal quality values. The WLAN signal quality value may be a WLAN RSSI value, and the cellular signal quality value may be a cellular RSSI value. The ratio may be a cellular/WLAN signal quality ratio. In the alternative, a WLAN/cellular signal quality ratio (i.e. the inverse) may be utilized. Although the signal indicator value may be derived or calculated based on such ratio, the derivation or calculation may also involve multiplying the ratio by a constant value or other variable value(s), and/or may involve summing such ratio value with a constant value or other variable value(s), if needed for producing a more reliable signal indicator.

In another embodiment, the comparative evaluation may involve comparing or finding the difference between the WLAN and cellular signal strengths, where the vertical handover is initiated in response to the difference being greater than a predetermined threshold.

Thus, the mechanism monitors the changes in patterns in both the WLAN and cellular radio signal strengths to determine whether the mobile device is transitioning from indoors to outdoors, or vice versa. In response to detecting such transitioning, the mobile device initiates procedures for performing a vertical handover of the voice or the data call from WLAN to cellular, or cellular to WLAN, as appropriate.

More particularly, using such information from both the WLAN and cellular air interfaces, a signal indicator value which is based on the cellular/WLAN signal quality ratio is regularly (e.g. periodically) calculated, stored and tracked. WLAN and cellular RSSI information received from their respective air interfaces may be utilized, for example. The quantification of the ratio between changes (i.e. drops or increases) of the signals received from both air interfaces provides a trend in the cellular/WLAN signal quality ratio. It is this trend that is used to determine the location transitioning of the mobile device (i.e. indoor or outdoor location, and transitions).

If the mobile device is determined to be transitioning from indoors to outdoors, then communication operations for the voice or the data call are switched from cellular to WLAN. The transition from indoors to outdoors is detected by a deterioration in WLAN RSSI with an accompanying increase in cellular RSSI. On the other hand, if the mobile device is determined to be transitioning from outdoors to indoors, then communication operations for the voice or the data call are switched from WLAN to cellular. Prior to detection of the transition, the mobile device is currently scanning for WLAN networks and, upon connecting to a WLAN, both the WLAN RSSI and the cellular RSSI are monitored. The transition from outdoors to indoors is detected by a deterioration in cellular RSSI with an accompanying increase in WLAN RSSI.

Figure 3:
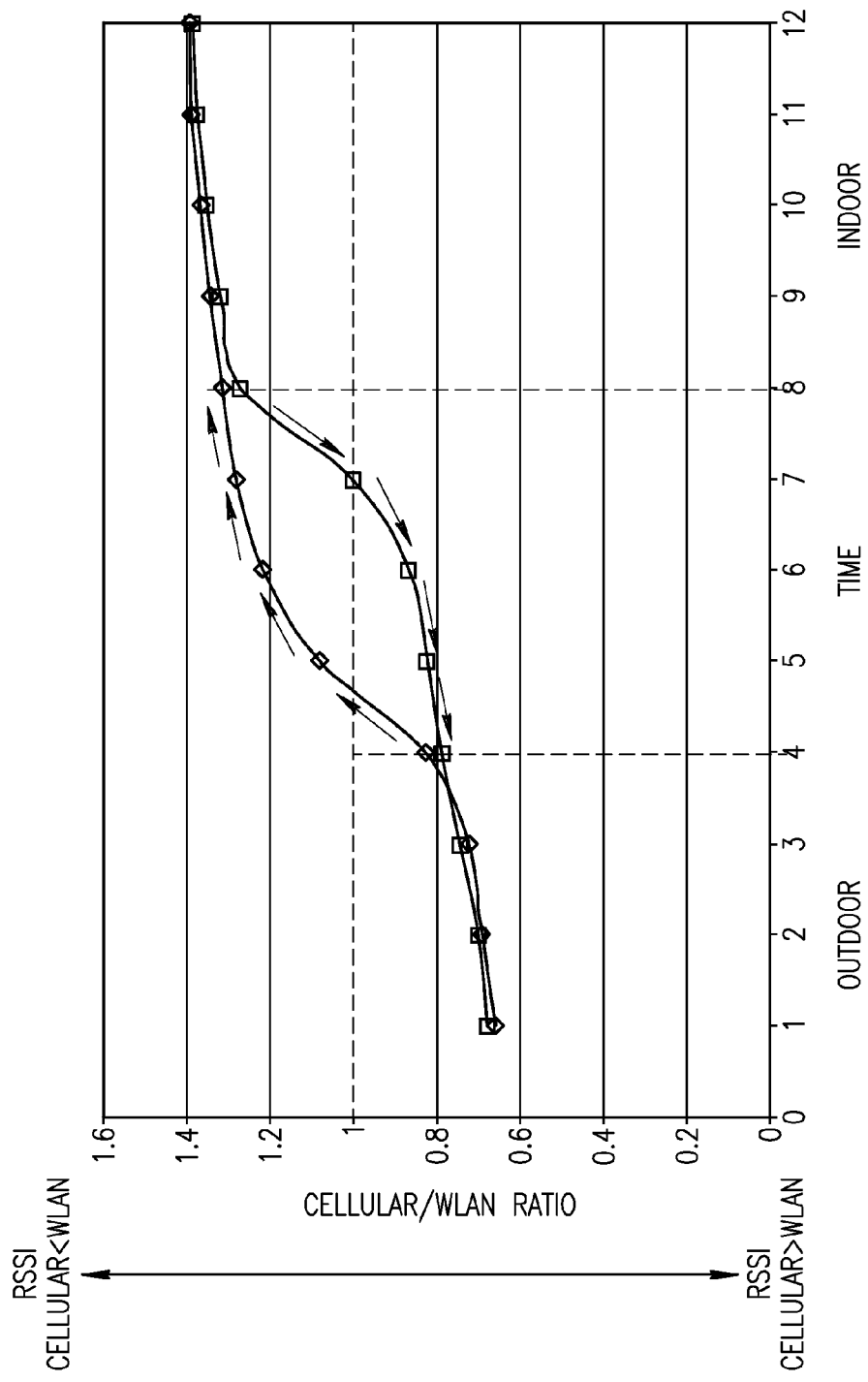
FIG. 3 is an example graph of cellular/WLAN signal quality ratio for an indoor-to-outdoor and an outdoor-to-indoor transition of the mobile communication device.
Figure 4:
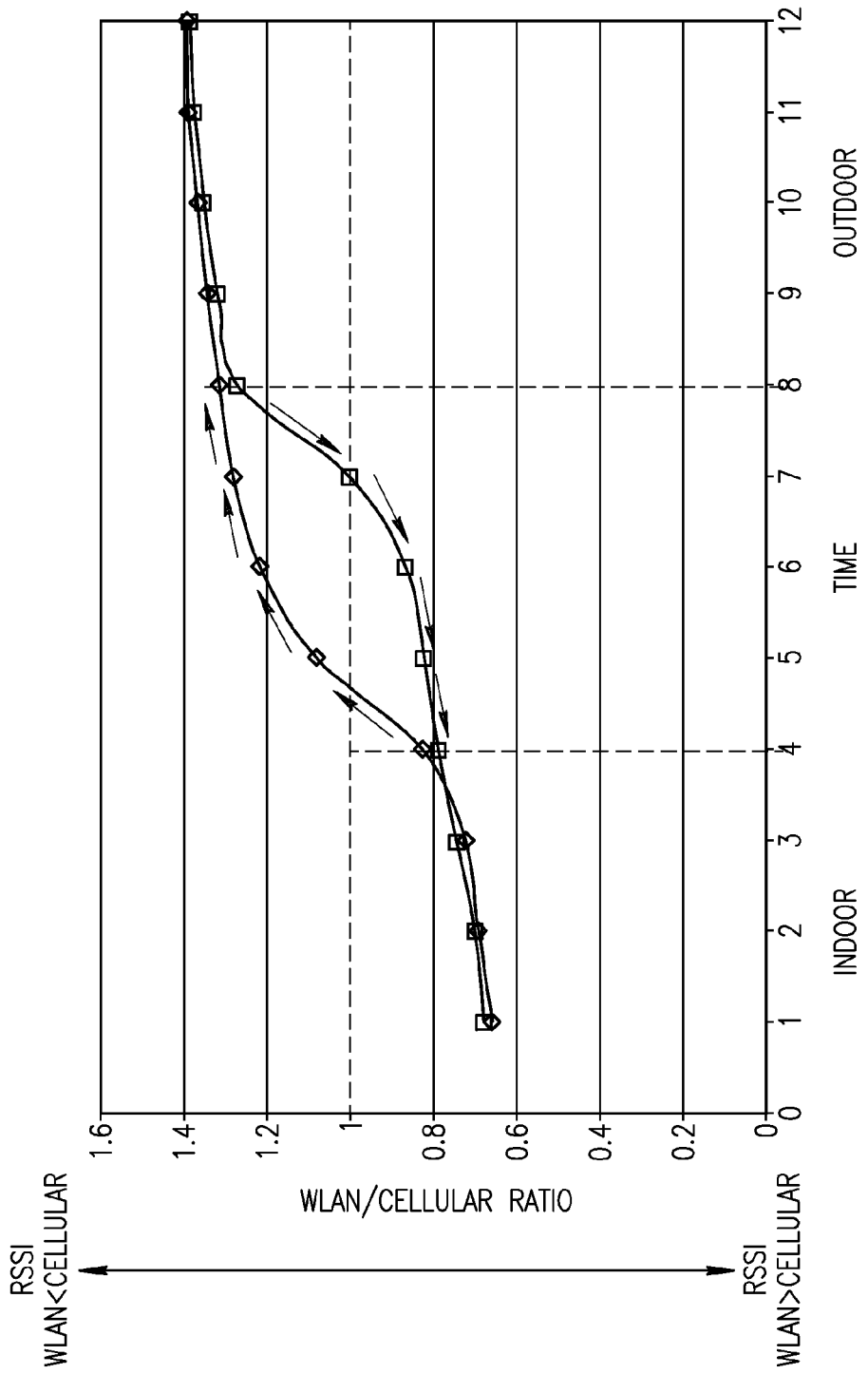
FIG. 4 is an example graph of WLAN/cellular signal quality ratio for an indoor-to-outdoor and an outdoor-to-indoor transition of the mobile communication device.

An example graph of variations in cellular/WLAN signal quality ratio for an indoor-to-outdoor and an outdoor-to-indoor transition is shown in FIG. 3. Similarly, an example graph of variations in WLAN/cellular signal quality ratio for an indoor-to-outdoor and an outdoor-to-indoor transition is shown in FIG. 4.

With respect to FIG. 3, the trace marked with the squares represents the cellular/WLAN RSSI ratio values for the mobile device making a transition from an indoor location to an outdoor location over a period of time. On the other hand, the trace marked with the diamonds represents the cellular/WLAN RSSI ratio values for the mobile device making a transition from an outdoor location to an indoor location over a period of time. Ratio values greater than one indicate the cellular RSSI is lesser than the WLAN RSSI. This typically indicates the mobile device is in (or may be transitioning to) an indoor location. Conversely, ratio values less than one indicate a cellular RSSI greater than the WLAN RSSI. This typically indicates the mobile device is in (or may be transitioning to) an outdoor location.

Considering the notations Cellular RSSI=C, WLAN RSSI=W, then:
  Case 1: If Ratio is based on C/W, then
  Ratio>1 means Cellular_RSSI<WLAN_RSSI, and device is in an Indoor location
  (e.g. −80 dBm Cellular_RSSI<−60 dBm WLAN_RSSI)
  Ratio<1 means Cellular_RSSI>WLAN_RSSI, and device is in an Outdoor location
  (e.g. −60 dBm Cellular_RSSI>−80 dBm WLAN_RSSI)
  Case 2: If Ratio is based on W/C, then
  Ratio>1 means Cellular_RSSI>WLAN_RSSI, and device is in an Outdoor location
  (e.g. −60 dBm Cellular_RSSI<−80 dBm WLAN_RSSI)
  Ratio<1 means Cellular_RSSI<WLAN_RSSI, and device is in an Indoor location
  (e.g. −80 dBm Cellular_RSSI<−60 dBm WLAN_RSSI)

Figure 5:
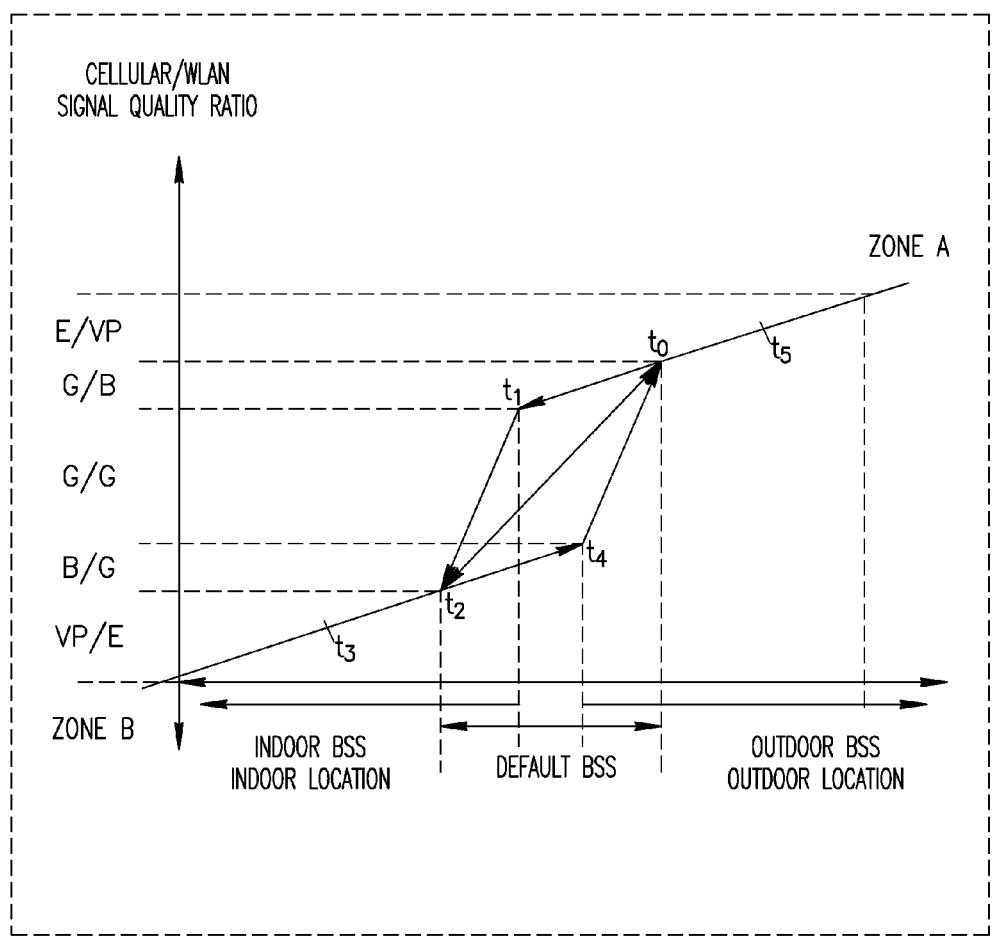
FIG. 5 is a diagram illustrating the transition point changes based on the cellular/WLAN signal quality ratio.

A diagram illustrating exemplary transition point changes based on the cellular/WLAN signal quality ratio is shown in FIG. 5. To aid in algorithmically determining the location of the mobile device, RSSI values for both cellular and WLAN have been categorized and defined as below in Table 1.

TABLE 1

Cellular and WLAN RSSI Category Definitions

| RSSI Value | Category | Representation |
|---|---|---|
| Greater than −20 dBm | Excellent | E |
| −21 to −45 dBm | Very Good | VG |
| −46 to −65 dBm | Good | G |
| −66 to −75 dBm | Average | A |
| −76 to −85 dBm | Bad | B |
| −86 to −90 dBm | Poor | P |
| Lesser than −90 dBm | Very Poor | VP |

These RSSI value definitions are used in the graph of FIG. 5 to define the cellular/WLAN signal quality ratio levels as the mobile device moves between indoor (Zone B) and outdoor locations (Zone A).

In the case when the mobile device is transitioning from an outdoor location (cellular operations) to an indoor location (WLAN operations), the possible transition points that can be made are identified and presented below in Table 2.

TABLE 2

Transition Points For Outdoor-To-Indoor Transition

| Step A | Step B | Cellular/WLAN Signal Quality Ratio Transition Point |
|---|---|---|
| $t_0$ E/VP | $t_1$ G/B | $TR_1$ |
| $t_0$ E/VP | $t_2$ B/G | $TR_2$ |
| E/VP | VP/E | $TR_3$ |
| $t_1$ G/B | $t_2$ B/G | $TR_4$ |
| G/B | VP/E | $TR_5$ |
| $t_2$ B/G | $t_3$ VP/E | $TR_6$ |

Thus, six transition points, TR1 through TR6, are defined for the mobile device making a transition from an outdoor location to an indoor location (i.e. a transition from cellular to WLAN).

Similarly, in the case when the mobile device is transitioning from indoors to outdoors, the possible transition points that can be made are identified and presented below in Table 3.

TABLE 3

Transition Points for Indoor-To-Outdoor Transition

| Step A | Step B | Cellular/WLAN Signal Quality Ratio Transition Point |
|---|---|---|
| $t_2$ VP/E | $t_4$ B/G | $TR_7$ |
| $t_2$ VP/E | $t_0$ G/B | $TR_8$ |
| VP/E | E/VP | $TR_9$ |
| $t_4$ B/G | $t_0$ G/B | $TR_{10}$ |
| B/G | E/VP | $TR_{11}$ |
| $t_0$ G/B | $t_5$ E/VP | $TR_{12}$ |

Thus, six transition points, TR7 through TR12, are defined for the mobile device making a transition from an indoor location to an outdoor location (i.e. a transition from WLAN to cellular).

It is appreciated that the transition thresholds provided in Tables 1, 2, 3 supra represent an example for illustration purposes. Other threshold values and category definitions may be used depending on the particular implementation and design considerations.

Figure 6:
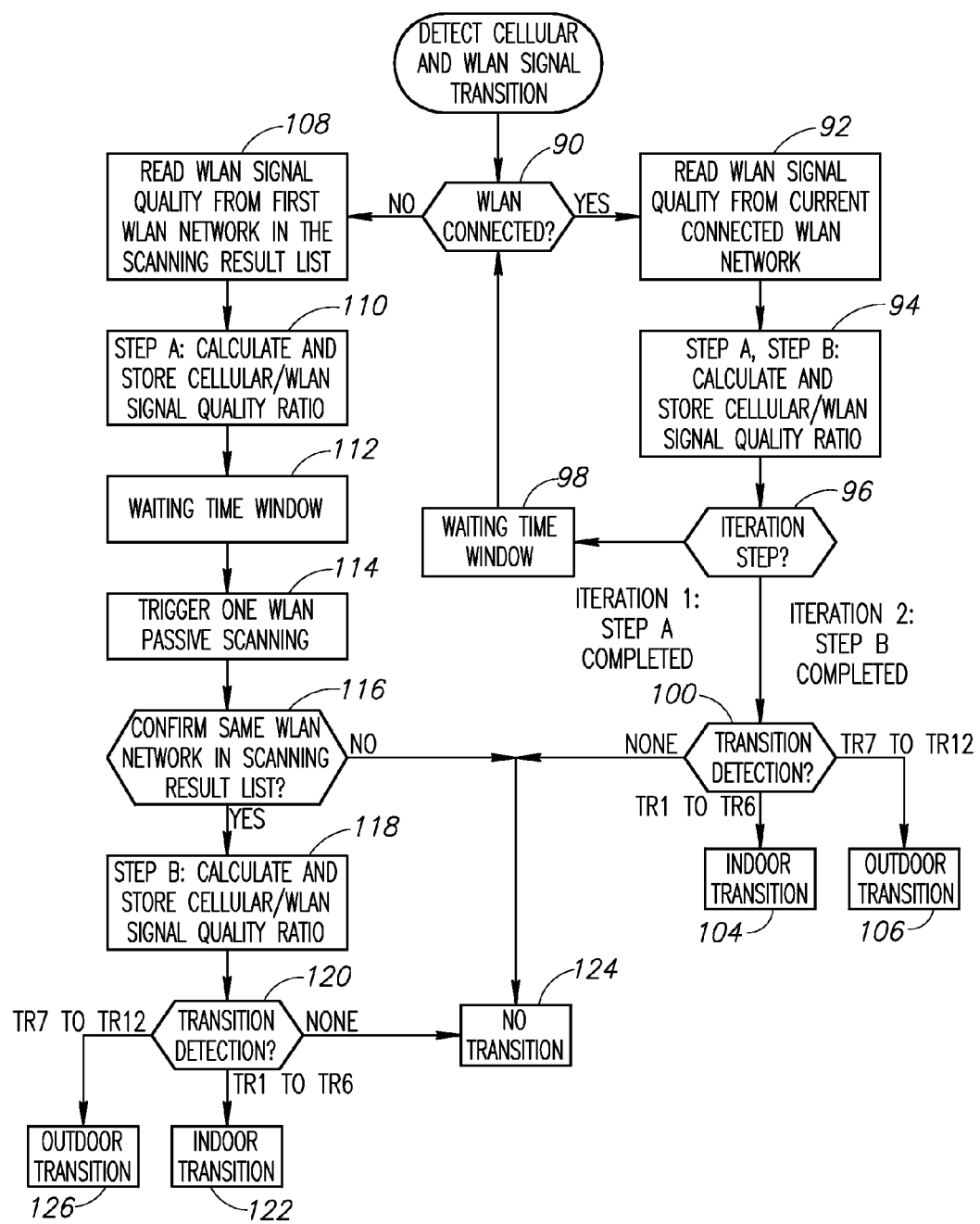
FIG. 6 is a flow diagram illustrating an example method of detecting cellular and WLAN radios signal transitions.

A flow diagram illustrating an example method of detecting cellular and WLAN signal transition is shown in FIG. 6. The method of FIG. 6 attempts to detect a cellular and WLAN signal transition and may be regularly performed (e.g. on a periodic basis). The mobile device identifies whether it is currently connected to a WLAN (step 90). If not connected with a WLAN, a WLAN scan is performed and the resulting scan results list is sorted according to RSSI value. The WLAN signal quality level is read from the first WLAN network in the scan results list (i.e. the strongest signal) (step 108). In the alternative, the WLAN signal quality level is read from the first WLAN network in the scan results list (i.e. the strongest signal) that also matching a corresponding WLAN profile stored in the mobile device. A first cellular signal quality instantaneous reading is also made (e.g. from use of a cellular signal from the home PLMN "HPLMN" or otherwise the last registered PLMN "RPLMN"), and the cellular/WLAN signal quality ratio is calculated (step 110). This step is referred to as STEP A. The mobile device then waits a waiting time window, e.g. two (2) seconds (step 112) and a single WLAN passive scanning is performed (step 114). If the first WLAN network on the scan results list is different than that found during step 108 above, then no transitioning is detected (step 124).

If the first WLAN network on the scan results list is confirmed as that found during step 108 above (step 116), then a second cellular signal quality instantaneous reading is made (e.g. from use of a cellular signal from the HPLMN or otherwise the last RPLMN), and the cellular/WLAN signal quality ratio is again calculated (step 118). This step is referred to as STEP B. Note that STEP B can be repeated to increase the accuracy of device's location estimate or transitioning.

If a transitioning corresponding to any one of TR1 to TR6 is identified (step 120), then an indoor transitioning is detected (step 122). If a transitioning corresponding to any one of TR7 to TR12 is identified (step 120), then an outdoor transitioning is detected (step 126). If no transitioning corresponding to any one of TR1 to TR12 is identified (step 120) than 'no transitioning' is detected (step 124).

If the mobile device is connected to a WLAN (step 90), the WLAN signal quality level is read from the currently connected WLAN (step 92). A first cellular signal quality instantaneous reading is also made (e.g. from use of a cellular signal from the HPLMN or otherwise the last RPLMN), and the cellular/WLAN signal quality ratio is calculated (step 94). This step is referred to as STEP A. If the number of iteration steps for calculating the cellular/WLAN signal quality ratio is less than two (2) (step 96), then the mobile device waits a waiting time window (e.g. two (2) seconds) (step 98). In the event of WLAN disconnection during the waiting time window, the transition algorithm resumes from the WLAN disconnected state (step 90).

Then, a second iteration of cellular signal quality instantaneous reading is made (e.g. from use of a cellular signal from the HPLMN or otherwise the last RPLMN), and the cellular/WLAN signal quality ratio is calculated (step 94). This step is referred to as STEP B. To achieve higher accuracy, the number of iterations for calculating the cellular/WLAN signal quality ratio can be increased (e.g. 3, 4 or higher), for a more reliable confirmation of the cellular/WLAN signal trend.

If a transitioning corresponding to any one of TR1 to TR6 is identified (step 100), then an indoor transitioning is detected (104). If a transitioning corresponding to any one of TR7 to TR12 is identified (step 100), then an outdoor transitioning is detected (106). If no transition corresponding to any one of TR1 to TR12 is identified (step 100) then 'no transitioning' is detected (step 124).

Note that since the instantaneous cellular RSSI values continuously change randomly due to fading, shadowing, multipath and path loss effects; in one implementation, the mechanism utilizes averaged RSSI values which compensate for these negative effects. In addition, however, other factors may be used to indicate the indoor/outdoor transitioning. For example, the AGC added offset to compensate for gain difference can be used as an indicator. When the cellular signal quality changes, the gain control is also modified accordingly, and can be used as an additional indication of the change in location. Further, time-in-advance that the cell controller sends to mobile device for transmission time adjustments based on mobile's distance from tower can also be used. Other possible factors include power control measurements which also change according to the quality of the cellular link.

Figure 7:
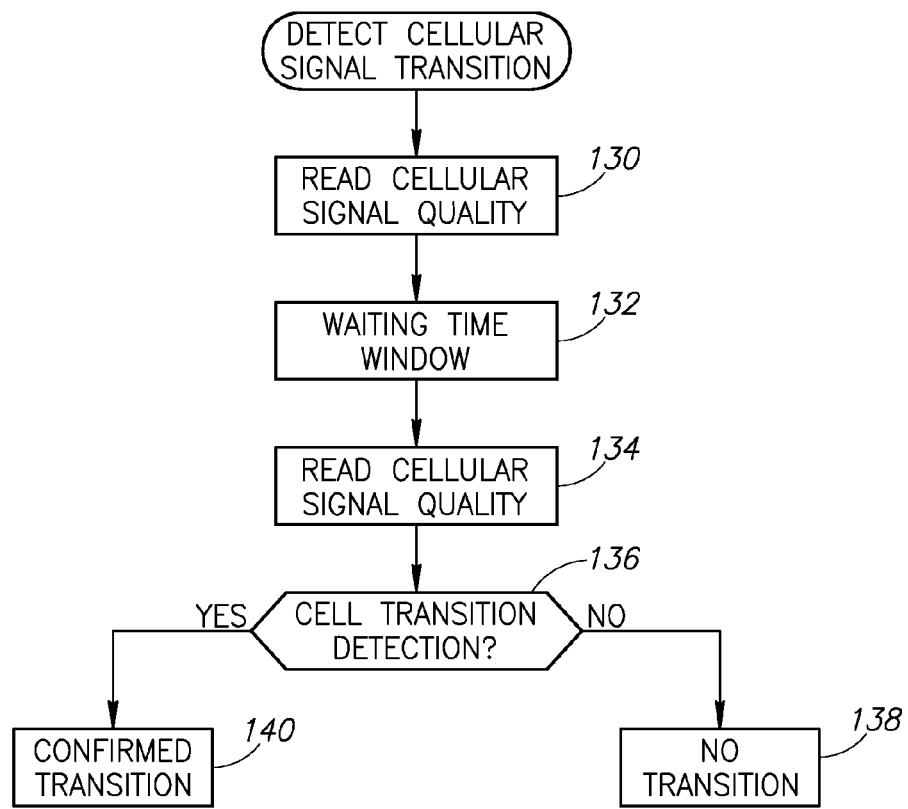
FIG. 7 is a flow diagram illustrating an example method of detecting cellular signal transitions.

A flow diagram illustrating an example method of detecting cellular signal transitions is shown in FIG. 7. The method of FIG. 7 is used in detecting a device's location or transitioning when in a WLAN disconnected state. First, a first instantaneous cellular signal quality reading is made (step 130). After a waiting time window, e.g. 2 seconds (step 132), a second instantaneous cellular signal quality reading is made (step 134). A cell transition is then detected if the difference between the two cellular signal quality readings exceeds a threshold (e.g. +/−10 dBm) (step 136). A confirmed transition is detected if the difference exceeds the threshold (step 140); otherwise no transition is detected (step 138).

Figure 8:
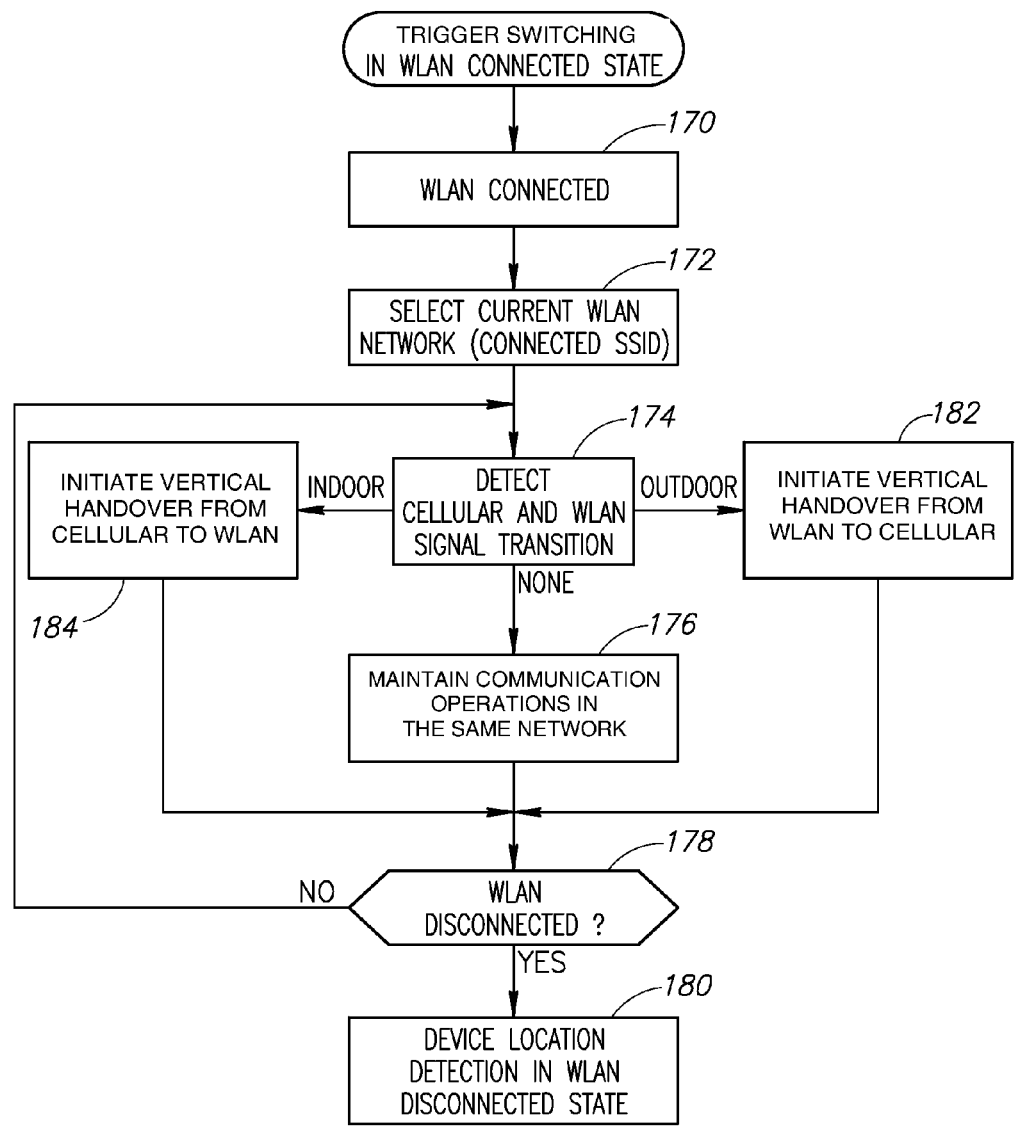
FIG. 8 is a flow diagram illustrating an example method of detecting a transition in a WLAN connected state for initiating a vertical handover.

A flow diagram illustrating an example method for use in determining and triggering network switching when in a WLAN connected state (step 170) is shown in FIG. 8. The current WLAN network (i.e. the connected SSID) is selected (step 172). The mobile device then identifies whether a cellular and WLAN signal transitioning event occurred (step 174), as previously described in connection with the flow diagram of FIG. 6. If no transitioning is identified (step 174), then the mobile device maintains communication operations in the same network (step 176).

If an outdoor-to-indoor transitioning is identified in step 174, then the mobile device initiates procedures for performing a vertical handover of the voice or the data call from cellular to WLAN (step 184). If an indoor-to-outdoor transitioning is identified in step 174, then the mobile device initiates procedures for performing a vertical handover of the voice or the data call from WLAN to cellular (step 182).

Whether indoor, outdoor, or no transitioning is identified, it is then checked whether the WLAN is disconnected (step 178). If it is not disconnected, the method returns to step 172 and repeats. If WLAN is disconnected, network switching determination and triggering in the WLAN disconnected state is performed (step 180), as described in connection with the flow diagram in FIG. 9 below.

Figure 9:
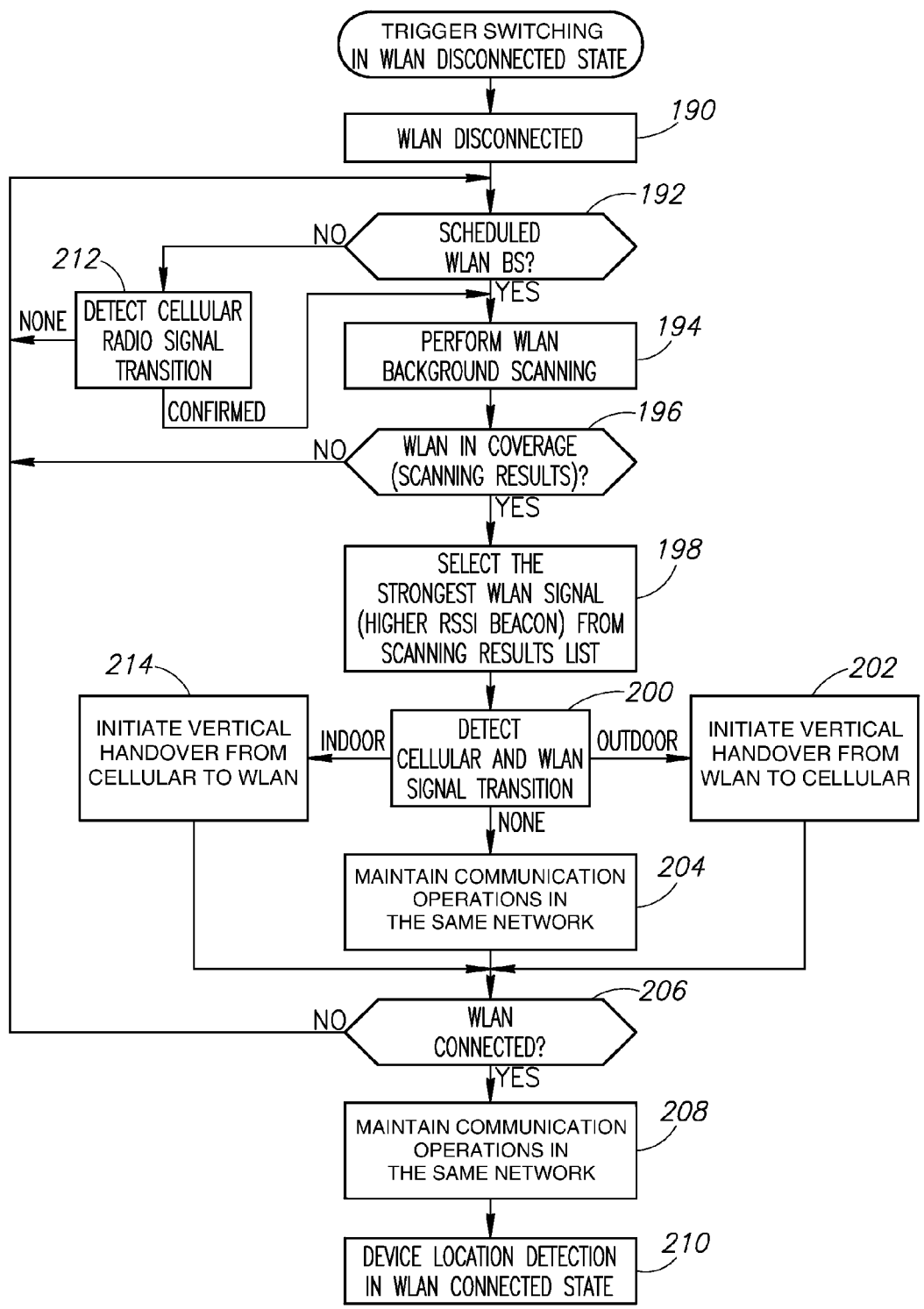
FIG. 9 is a flow diagram illustrating an example method of detecting a transition in a WLAN disconnected state for initiating a vertical handover.

A flow diagram illustrating an example method for use in determining and triggering network switching when in a WLAN disconnected state is shown in FIG. 9. Initially, the mobile device is in a WLAN disconnected state (step 190). Turning the WLAN radio on causes the mobile device to set to the background scanning scheme, and indoor/outdoor location unknown. It is then determined whether a WLAN background scan is scheduled (step 192). If a scan is not scheduled, then the mobile device continues with detecting cellular radio signal transitioning (step 212) (previously described with respect to the flow diagram of FIG. 7), as the mobile device may be moving out of a WLAN coverage area. If no cellular radio transitioning is detected, the method returns to step 192.

If a cellular radio transitioning is confirmed (step 212), or a WLAN background scan is scheduled (step 192), then WLAN background scanning is performed (step 194). It is then determined whether the mobile device is in WLAN coverage and attempts to detect surrounding WLAN APs (step 196). If no surrounding WLAN APs are found, the method returns to step 192. If surrounding WLAN APs are found, the strongest WLAN signal (i.e. higher RSSI Beacon) from the scanning results list is selected (step 198).

The mobile device then attempts to detect cellular and WLAN signal transitioning (step 200) as previous described in relation to the flow diagram of FIG. 6. If no transitioning is identified, then the mobile device maintains communication operations in the same network (step 204). If an outdoor-to-indoor transitioning is identified, then the mobile device initiates procedures for performing a vertical handover of the voice or the data call from cellular to WLAN (step 214). On the other hand, if an indoor-to-outdoor transitioning is identified, then the mobile device initiates procedures for performing a vertical handover of the voice or the data call from WLAN to cellular (step 202).

It is then determined whether the WLAN is connected (step 206). If it is not connected, the method continues with step 192. If it is connected, then the mobile device maintains communication operations in the same network (step 208). The determination and triggering of network switching when in the WLAN connected state method is then performed (step 210) as described in detail in connection with the flow diagram of FIG. 8.

Figure 10:
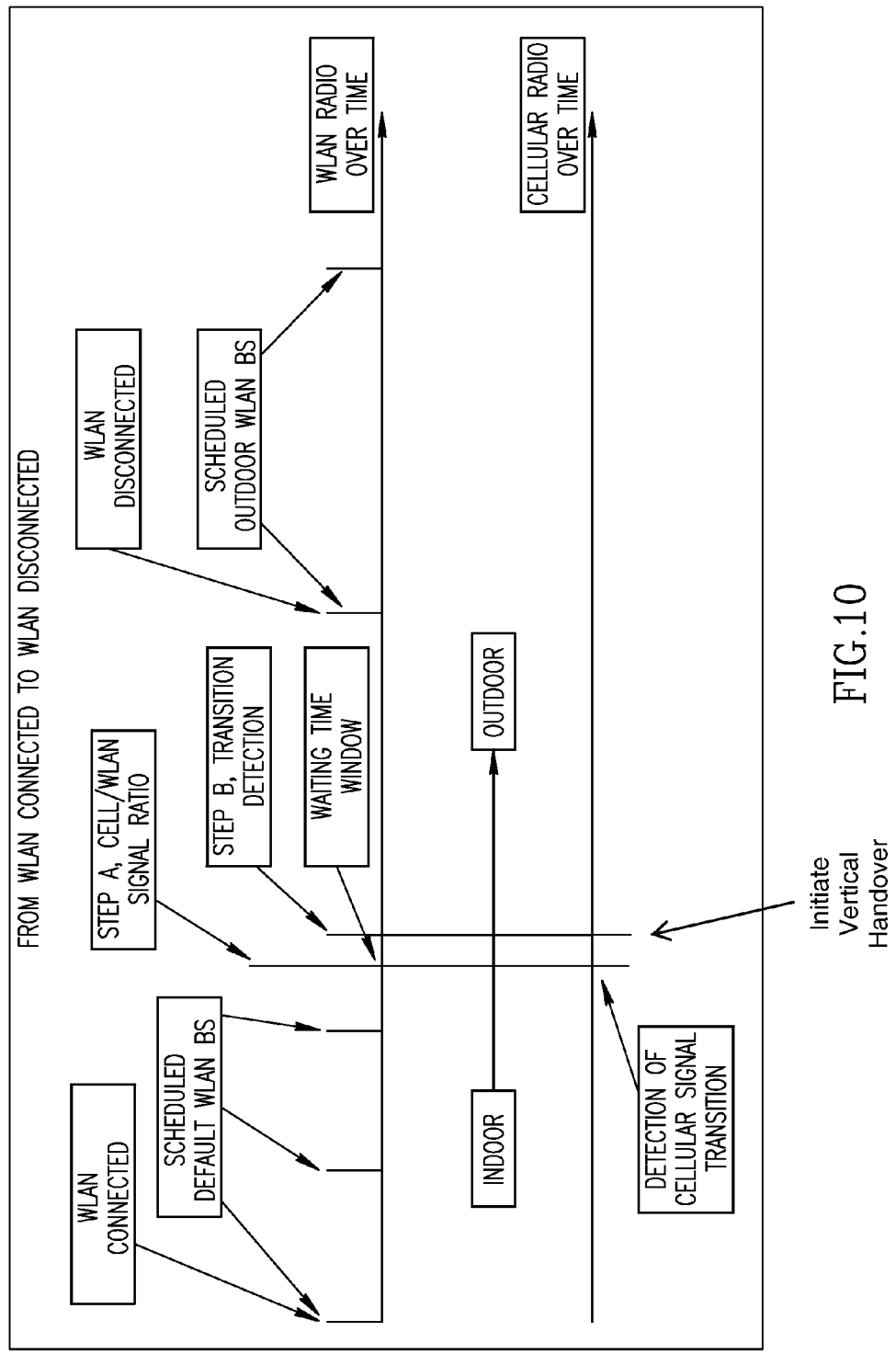
FIG. 10 is a timing diagram illustrating an indoor WLAN connected state to an outdoor WLAN disconnected state transition.
Figure 11:
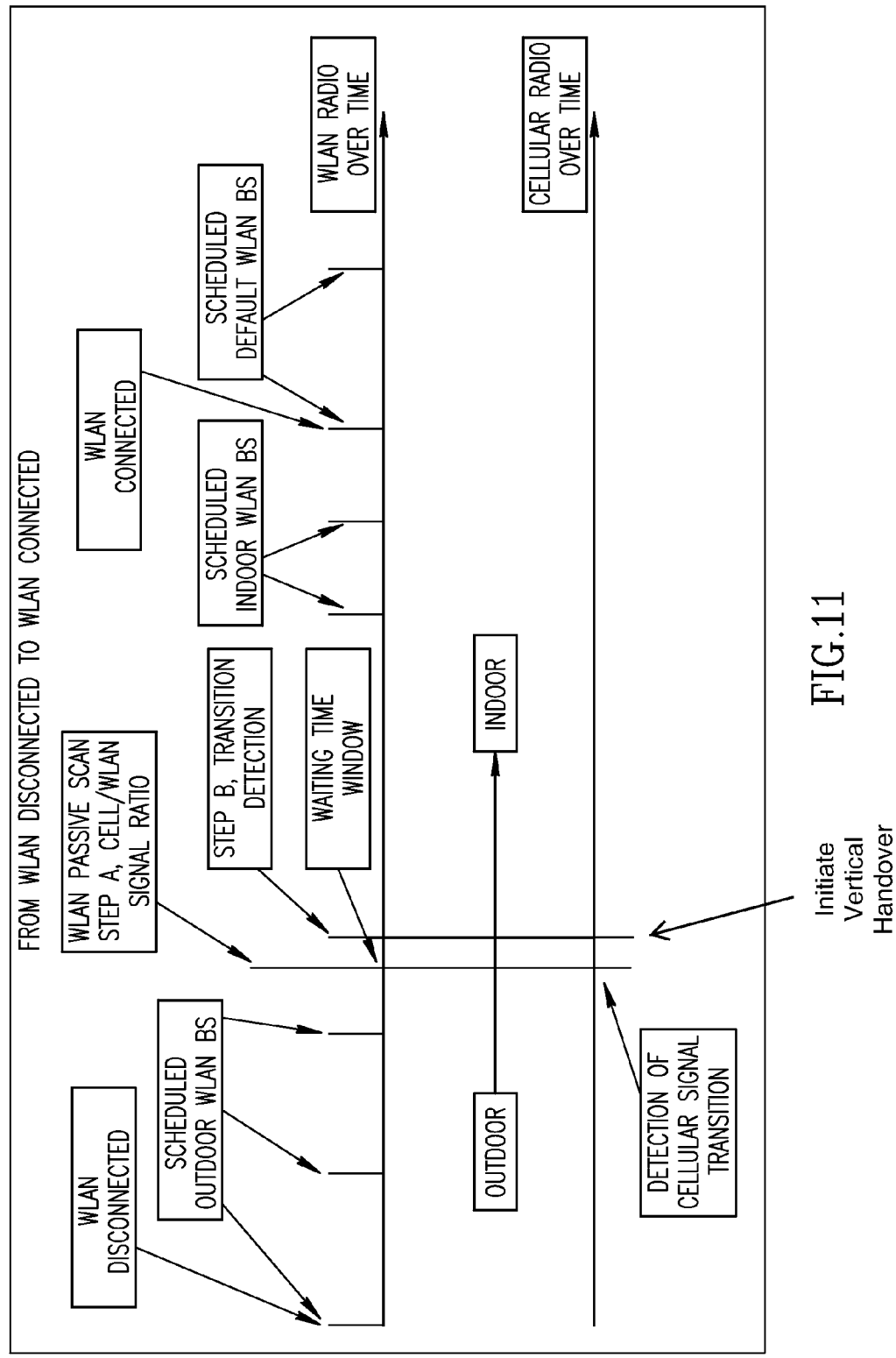
FIG. 11 is a timing diagram illustrating an outdoor WLAN disconnected state to an indoor WLAN connected state transition.

Example timing diagrams are presented in FIGS. 10-11 to aid in understanding the application of the methods described above. These diagrams relate to scenarios where the mobile device is moving between indoors and outdoors and between connected and disconnected WLAN states.

In FIG. 10, a timing diagram illustrating an indoor WLAN connected state to an outdoor WLAN disconnected state transition is shown. Initially, the mobile device is located in an indoor location with WLAN connected where scheduled background scanning is set. With reference to the method of FIG. 6, a STEP A event is detected where a change in the cellular/WLAN signal quality ratio is detected along with the possible detection of a cellular signal transition. A second confirming transition (STEP B) is detected as well after the waiting time window period. In response, the mobile device initiates procedures for performing a vertical handover of the voice or the data call from WLAN to cellular. Eventually, as the mobile device continues outdoors, WLAN becomes disconnected.

In FIG. 11, a timing diagram illustrating an outdoor WLAN disconnected state to an indoor WLAN connected transition is shown. In this example, the mobile device is outdoors with WLAN disconnected and scheduled with WLAN background scanning. A WLAN passive scan detects a transition (STEP A) as the mobile device is moved indoors, along with the possible detection of a cellular signal transition. A second confirming transition (STEP B) is detected as well after the waiting time window period. In response, the mobile device initiates procedures for performing a vertical handover of the voice or the data call from cellular to WLAN.

Figure 12:
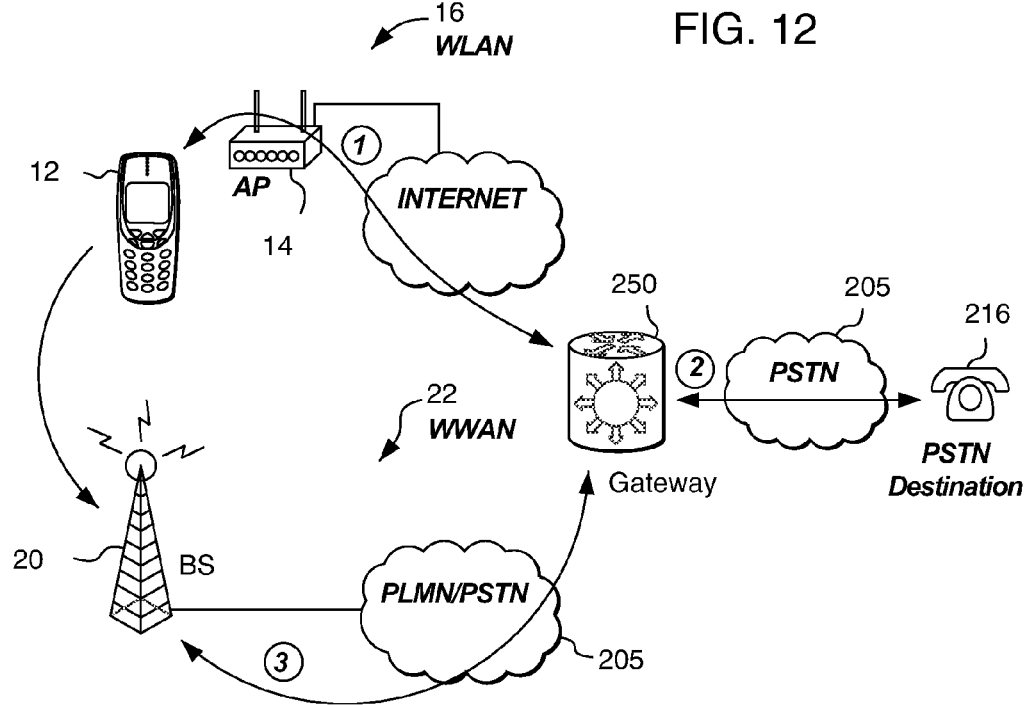
FIG. 12 is the communication system of FIG. 1 in more detail, for better illustrating an architecture and technique for initiating the appropriate procedures to perform vertical handover.

Referring now to FIG. 12, what is shown is the communication system of FIG. 1 in more detail, to better illustrate an architecture and technique which may be utilized by mobile device 12 to initiate the appropriate procedures to perform vertical handover of a voice or a data call between WLAN 16 and WWAN 22.

As illustrated in FIG. 12, a conferencing gateway 250 is one entity that may be utilized to facilitate vertical handover between WLAN 16 and WWAN 22. In one embodiment, conferencing gateway 250 is an IP-PBX of a communication network, such as an IP-PBX of WLAN 16. In general, conferencing gateway 250 is operative to facilitate the establishment and maintenance of voice calls between different communication devices (which may, for example, implement different communication protocols and utilize different interfaces), as well as to facilitate the handover of such calls between heterogeneous wireless networks (e.g. WLAN 16 and WWAN 102). Such operation is achieved through use of separate (separable) call connection legs for voice calls and conference room connections.

For these purposes, conferencing gateway 250 may utilize multiple communication interfaces in its operation. These interfaces may be or include separate physical interfaces, or separate functional or logical interfaces. One of the communication interfaces of conferencing gateway 250 is an Ethernet communication interface which provides conferencing gateway 250 with a communicative coupling to a router (not shown in FIG. 14), for communicatively coupling to a LAN of WLAN 16. Another one of the communication interfaces of conferencing gateway 250 may be a PSTN or foreign exchange office (FXO) interface which provides conferencing gateway 250 with a communicative coupling to PSTN 205, and thus to WWAN 22 and mobile device 12. Yet another communication interface of conferencing gateway 250 may be another PSTN or FXO interface which provides conferencing gateway 250 with another communicative coupling to PSTN 205 (and thus to another destination such as a PSTN communication device 216).

To allow for basic interworking between different types of networks, conferencing gateway 250 may be configured to perform two tasks: (1) signal conversion by a signaling module; and (2) media stream conversion by a media gateway module. ISDN User Part (ISUP) signaling is converted into SIP signaling by the signaling module, and vice versa. With the media gateway module, the voice steam arriving at PSTN 250 is converted into Real-time Transport Protocol (RTP) media stream at the ingress point of the LAN, and likewise it is converted into a PSTN media stream at the ingress point of PSTN 250. Even though the signaling module and the media gateway module may be considered as two separate logical entities, there is nothing preventing them from residing at the same physical entity in conferencing gateway 250. A media gateway control module may be utilized to implement a control protocol, such as a Media Gateway Control Protocol (MGCP), to perform handshaking between the signaling module and the media gateway module. Thus, in general, conferencing gateway 250 generally serves as a media stream mixer. Centralized conference rooms may be created, where multiple media streams may be mixed together. The mixing and conversion of the media stream may sometimes be referred to as "transcoding". Note, however, that some telephony devices with the ability to establish two independent calls can perform the mixing locally without resorting to centralized conference rooms.

One basic approach used by mobile device 12 for vertical handover is now described with reference to FIG. 12, for the case where the voice or the data call is initially established via the WLAN 16. Here, the call is initially established with two connection legs: a connection leg 1 via a WLAN transceiver of mobile device 12 to conferencing gateway 250, and a connection leg 2 from conferencing gateway 250 to communication device 216. When a vertical handover is to be performed, as detected based on the signal indicator value, for example, mobile device 12 sends one or more messages via the network(s) such that connection leg 1 is substituted with a newly-established connection leg 3. In response, connection leg 3 is established from a WWAN (cellular) transceiver of mobile device 12 to the PSTN interface of the conferencing gateway 250 (e.g. rather than directly to communication device 216 itself). At this time, conferencing gateway 250 utilizes traditional conferencing techniques for these connection legs, which include transcoding and mixing the media streams for all three legs. Such approach allows for a true soft, seamless handoff, where the session from communication device 216 to conferencing gateway 250 is not affected by the handoff, and where there is a controllable overlap between the two media streams flowing from the two interfaces of mobile device 12 to conferencing gateway 250.

Advantageously, in accordance with the present techniques, a mobile device may be more efficiently and reliably initiate a vertical handover between heterogeneous networks, before any connections are lost.

Thus, techniques in a mobile device for use in initiating vertical handover of a voice or a data call between a wireless local area network (WLAN) and a wide area wireless network (WWAN) have been described. The mobile device performs communication operations for maintaining the voice or the data call via the WLAN or the WWAN. During the voice or the data call, the mobile device identifies a WLAN signal quality value of signals with the WLAN as well as a WWAN signal quality value of signals with the WWAN. The mobile device then performs a comparative evaluation of the WLAN and the WWAN signal quality values, and initiates a vertical handover of the voice or the data call between the WLAN and the WWAN based on the comparative evaluation of the WLAN and WWAN signal quality values. The comparative evaluation may involve calculating a signal indicator value which is based on a ratio of the WLAN and the WWAN signal quality values. Alternatively, the comparative evaluation may involve comparing or finding the difference between the WLAN and the WWAN signal quality values.

Note that the terminology used herein is for the purpose of describing particular implementations only and is not intended to be limiting of the mechanism. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Note further that the corresponding structures, materials, acts, and equivalents of all means or step plus function elements in the claims below are intended to include any structure, material, or act for performing the function in combination with other claimed elements as specifically claimed. The description of the mechanism has been presented for purposes of illustration and description, but is not intended to be exhaustive or limited to the mechanism in the form disclosed. As numerous modifications and changes will readily occur to those skilled in the art, it is intended that the mechanism not be limited to the limited number of implementations described herein. Accordingly, it will be appreciated that all suitable variations, modifications and equivalents may be resorted to, falling within the spirit and scope of the mechanism. The implementations were chosen and described in order to best explain the principles of the mechanism and the practical application, and to enable others of ordinary skill in the art to understand the mechanism for various implementations with various modifications as are suited to the particular use contemplated.

For example, although the detailed description focuses on the use of two specific networks (namely a cellular network as the WWAN and an IEEE 802.11 network as the WLAN), any two suitable heterogeneous networks may be utilized, where one of the networks has overlapping coverage with or is contained within the other network. For example, the WLAN may be an IEEE 802.11-based network and the WWAN may be an IEEE 802.16e-based network. As another example, the WLAN may be an IEEE 802.16e-based network and the WWAN may be the cellular network. Home Node-B cells of a 3G macro Radio Access Network (RAN) may be also utilized with cellular, IEEE 802.11, or IEEE 802.16 technologies in the same fashion.

It is intended that the appended claims cover all such features and advantages of the mechanism that fall within the spirit and scope of the mechanism. As numerous modifications and changes will readily occur to those skilled in the art, it is intended that the mechanism not be limited to the limited number of implementations described herein. Accordingly, it will be appreciated that all suitable variations, modifications and equivalents may be resorted to, falling within the spirit and scope of the mechanism.

What is claimed is:

1. A method in a mobile communication device for use in initiating vertical handover of a voice or a data call between a wireless local area network (WLAN) and a wide area wireless network (WWAN), the method comprising:
    performing communication operations for maintaining the voice or the data call via the WLAN or the WWAN;
    during the voice or the data call:
        identifying a WLAN signal quality value of signals with the WLAN;
        identifying a WWAN signal quality value of signals with the WWAN;
        calculating a signal indicator value from both of the WLAN and WWAN signal quality values by calculating a comparative evaluation between the relative WLAN and the WWAN signal quality values;
        wherein calculating the signal indicator value is based on a ratio of the WLAN and the WWAN signal quality values; and
        wherein the initiating the vertical handover of the voice or the data call between the WLAN and the WWAN is in response to changes in the ratio over time; and
        initiating vertical handover of the voice or the data call between the WLAN and the WWAN based on the signal indicator value.

2. The method of claim 1, further comprising: wherein calculating the comparative evaluation further comprises finding a difference between the WLAN signal quality value and the WWAN signal quality value; and
    wherein the initiating the vertical handover for the voice or the data call between the WLAN and the WWAN is further in response to changes in the difference over time.

3. The method of claim 1, wherein the WWAN comprises a cellular telecommunications network.

4. The method of claim 1, wherein the WLAN comprises an IEEE 802.11 network.

5. The method of claim 1, wherein the WLAN signal quality comprises a WLAN radio signal strength indicator (RSSI) value and the WWAN signal quality comprises a WWAN RSSI value.

6. The method of claim 1, further comprising:
    wherein the performing the communication operations comprises performing the communication operations for maintaining the voice or the data call via the WLAN; and
    wherein the initiating the vertical handover comprises initiating vertical handover of the voice or the data call from the WLAN to the WWAN based on the comparative evaluation of WLAN and WWAN signal quality values.

7. The method of claim 1, further comprising:
    wherein the performing the communication operations comprises performing the communication operations for maintaining the voice or the data call via the WWAN; and
    wherein the initiating the vertical handover comprises initiating vertical handover of the voice or the data call from the WWAN to the WLAN based on the comparative evaluation of WLAN and WWAN signal quality values.

8. The method of claim 1, which is embodied as computer instructions stored in a non-transitory computer readable medium and executable by one or more processors of the mobile device for performing the method.

9. The method of claim 1, further comprising:
    obtaining signal strength measurements of the WWAN taken at different times during a period of time;
    obtaining signal strength measurements of the WLAN taken at different times during the period of time; and
    calculating the signal indicator value over the period of time;
    wherein the initiating the vertical handover of the voice or the data call between the WLAN and the WWAN is in response to an increasing or decreasing trend in the signal indicator value over time.

10. The method of claim 1, wherein said initiating the vertical handover for the voice or the data call between the WLAN and the WWAN is further in response to the signal indicator value being greater than a predetermined threshold.

11. A mobile communication device, comprising:
    one or more processors;
    a WLAN transceiver coupled to the one or more processors and being operative for communications with a wireless local area network (WLAN);
    a WWAN transceiver coupled to the one or more processors and being operative for communications with a wireless wide area network (WWAN);
    the one or more processors being operative to:
        perform communication operations for maintaining a voice or a data performing communication operations for maintaining the voice or the data call via the WLAN or the WWAN;
        during the voice or the data call:
            identify a WLAN signal quality value of signals with the WLAN,
            identify a WWAN signal quality value of signals with the WWAN,
            calculate a signal indicator value from both of the WLAN and WWAN signal quality values by calculating a comparative evaluation between the WLAN and the WWAN signal quality values, wherein said calculating of the signal indicator value is based on a ratio of the WLAN and the WWAN signal quality values, and wherein said initiating the vertical handover of the voice or the data call between the WLAN and the WWAN is in response to changes in the ratio over time; and initiate vertical handover of the voice or the data call between the WLAN and the WWAN based on the signal indicator value.

12. The mobile communication device of claim 11, wherein said calculating of the comparative evaluation further comprises finding a difference between the WLAN signal quality value and the WWAN signal quality value, and
wherein said initiating the vertical handover for the voice or the data call between the WLAN and the WWAN is further in response to changes in the difference over time.

13. The mobile communication device of claim 11, wherein the WWAN comprises a cellular telecommunications network.

14. The mobile communication device of claim 11, wherein the WLAN comprises an IEEE 802.11 network.

15. The mobile communication device of claim 11, wherein the WLAN signal quality comprises a WLAN radio signal strength indicator (RSSI) value and the WWAN signal quality comprises a WWAN RSSI value.

16. The mobile communication device of claim 11, wherein the one or more processors are further operative to perform communication operations by performing the communication operations for maintaining the voice or the data call via the WLAN, and initiate the vertical handover by initiating vertical handover of the voice or the data call from the WLAN to the WWAN based on the comparative evaluation of WLAN and WWAN signal quality values.

17. The mobile communication device of claim 11, wherein the one or more processors are further operative to perform the communication operations by performing the communication operations for maintaining the voice or the data call via the WWAN, and initiate the vertical handover by initiating vertical handover of the voice or the data call from the WWAN to the WLAN based on the comparative evaluation of WLAN and WWAN signal quality values.

18. The mobile communication device of claim 11, wherein the one or more processors are further operative to:
obtain signal strength measurements of the WWAN taken at different times during a period of time;
obtain signal strength measurements of the WLAN taken at different times during the period of time; and
calculate the signal indicator value over the period of time;
wherein the initiating the vertical handover of the voice or the data call between the WLAN and the WWAN is in response to an increasing or decreasing trend in the signal indicator value over time.

* * * * *